United States Patent Office 3,597,340
Patented Aug. 3, 1971

3,597,340
RECOVERY OF LITHIUM AS LiOH.H₂O FROM AQUEOUS CHLORIDE BRINES CONTAINING LITHIUM CHLORIDE AND SODIUM CHLORIDE
Sammy C. Honeycutt and Ricardo O. Bach, Gastonia, N.C., assignors to Lithium Corporation of America, New York, N.Y.
No Drawing. Filed Nov. 5, 1968, Ser. No. 773,666
Int. Cl. C01d 1/06
U.S. Cl. 204—98                                   5 Claims

ABSTRACT OF THE DISCLOSURE

Recovery of lithium as $LiOH.H_2O$ from aqueous chloride feed brines containing LiCl and NaCl by electrolyzing said brines in a diaphragm cell, separating the solids from the electrolyzed brine, said solids comprising predominately $LiOH.H_2O$, and recrystallizing said $LiOH.H_2O$ to effect purification thereof.

---

Our invention relates to the treatment of aqueous chloride brines containing LiCl and NaCl to recover lithium values therefrom in the form of lithium hydroxide monohydrate ($LiOH.H_2O$).

Various natural brines, such as Great Salt Lake brines, Searles Lake brines and many other natural brines, salt wells, springs, as well as sea water, contain a variety of mineral salts, such as chlorides and sulfates of alkali metals and alkaline earth metals, said alkali metals commonly comprising largely sodium with smaller proportions of potassium and distinctly lesser proportions of lithium. Although Great Salt Lake brines, for instance, vary compositionally, depending upon the particular part of the lake from which they are taken, from year to year, and from season to season in any given year, an illustrative Great Salt Lake brine may contain about 19% or 20% sodium chloride, about 0.9% potassium chloride, about 3% magnesium chloride, about 2.5% sodium sulfate, about 0.04% lithium chloride, and small percentages of other salts, various of the foregoing being present in the form of double salts, the total chlorides comprising about 14% and the total sulfate content comprising somewhat less than 2%.

In processes for the recovery from such brines as those of the Great Salt Lake of potash values such as potassium chloride or potassium sulfate; and magnesium values as magnesium chloride or magnesium sulfate; and sodium values as sodium sulfate, which processes are carried out after intial removal from said brines, for instance, by solar evaporation and resulting precipitation, of a large part or the major part of the sodium chloride content thereof, residual brines or bitterns are obtained. These residual brines are commonly high in chloride ion and contain appreciable, though low, concentrations of lithium salts, essentially as lithium chloride; sodium chloride; and variable contents of sulfate ion, and potassium and magnesium ions, in the form of salts, and commonly additional small amounts of other salts. Thus, by way of example, illustrative bitterns comprise substantially saturated aqueous chloride solutions containing about (a) 0.18% lithium, 8.65% magnesium, 0.17% sodium, 0.80% potassium, and about 3% sulfate, and (b) 0.08 lithium, 7.2% magnesium, 0.5% sodium, 0.75% potassium, and 3% sulfate, with small or trace amounts of various other metal ions and cations.

The lithium values in said residual brines or bitterns have substantial economic significance provided that commercially feasible and inexpensive procedures are available for recovering the same in salable form. It is a desideratum of our present invention to separate the LiCl from the NaCl primarily, and from such other metal salts as may be present, and to recover the lithium as $LiOH.H_2O$. Chemical methods are known to effectuate the conversion of LiCl to $Li_2CO_3$ and then to react the latter with $Ca(OH)_2$ to convert the $Li_2CO_3$ to LiOH. Such procedures have a number of disadvantages, notably from the standpoint of cost considerations.

We have discovered that the lithium values in LiCl-NaCl brines, of the character described hereafter, can effectively be recovered in the form of $LiOH.H_2O$ by simple procedures which are materially less costly than the aforementioned chemical methods.

The feed brine for use in the practice of our invention may contain variable amounts of LiCl and NaCl as, for instance, from about 8 to about 30% LiCl, and from about 2 to about 15% NaCl. Generally speaking, it is preferred that the weight percentage of LiCl be not less than that of the NaCl and, desirably, the percentage of LiCl should substantially exceed that of the NaCl. Such brines may be saturated as to their NaCl contents or well below saturation. Illustrative feed brines are as follows in terms of their contents of LiCl and NaCl:

|   | LiCl (percent) | NaCl (percent) |
|---|---|---|
| 1 | 25 | 2.6 |
| 2 | 20 | 2 |
| 3 | 15 | 6 |
| 4 | 18 | 5 |
| 5 | 16 | 12 |
| 6 | 12 | 12 |

The balance of the feed brines is largely water with small proportions of other salts such as potassium and magnesium. It is important, however, that the content of magnesium, calculated as magnesium chloride, in the feed brine do not exceed about 0.01% by weight of the feed brine and, better still, be absent or be present in no more than trace quantities, in order to avoid causing clogging of the diaphragm. Generally speaking, the total concentration of all salts other than LiCl and NaCl in the feed brines should not exceed about 5% and, better still, should not exceed about 3%, by weight of said feed brines.

The feed brines for use in the practice of our present invention can be obtained in various ways as, for instance, by the removal from Great Salt Lake brines, or other suitable brine sources, of most of the potash values, sodium chloride and magnesium salts by known techniques, and concentrating the residual brines or bitterns by evaporation to increase the concentration of the lithium chloride to a desired value as, for instance, to in the range of 8 to 30% by weight of the starting or feed brines. The source of the feed brine, or the manner of obtaining or producing it, is not important to the practice of my present invention. An illustrative suitable procedure for removing impurities from bitterns is disclosed in the copending application of Nelli et al., Ser. No. 724,295, filed Apr. 25, 1968, and the resulting purified bitterns, after concentration by evaporation, can be used as the feed brine in the practice of our invention.

The method of our invention involves the combination of a number of interrelated steps which include initially electrolyzing the LiCl-NaCl feed brine in a diaphragm cell. In this connection, it may be noted that it is essential, in our method, that the catholyte and the anolyte be kept separate because dissolved chlorine gas, which forms at the anode during the electrolysis, reacts with hydroxyl ions to form hypochlorite ions, a result which is inimical to the successful practice of our method. Furthermore, if hydroxyl ions are allowed to reach the anode, they are reduced to oxygen gas. These reactions lower the hydroxyl concentration and result in reducing the current efficiency of the electrolysis cell. The use of a diaphragm cell is, therefore, as stated above, essential to the practice of the initial electrolysis or electrolyzing step of our method. With an effective diaphragm in the diaphragm cell, the current efficiency approaches 100%.

The electrolysis results in converting a substantial part of the LiCl to $LiOH.H_2O$, commonly of the order of about half, more or less, the balance of the LiCl remaining as such. The NaCl remains essentially unaffected by the electrolysis and the same is true with respect to the other salts which are present. Chlorine gas is formed at the anode, and a small amount of hydrogen gas is formed at the cathode which is discharged from the cell. A part of the water present in the starting or feed brine combines with the LiOH, which is produced in the electrolysis, as water of crystallization to form $LiOH.H_2O$.

It has also been found that $LiOH.H_2O$ is only slightly soluble in water solutions of LiCl and NaCl. Thus, by way of illustration, at 25° C., $LiOH.H_2O$ is soluble only to the extent of (a) about 4.2% in an aqueous solution of 19.4% LiCl and 2.2% NaCl, (b) about 3.9% in an aqueous solution of 20.4% LiCl and 1.8% NaCl, and (c) about 3.7% in an aqueous solution of 25.4% LiCl and 1.2% NaCl.

Accordingly, after the electrolysis, the solid impure $LiOH.H_2O$ is separated from the electrolyzed solution by filtration or other conventional solid-liquid separating means. The filtrate or recovered solution may be evaporated to dryness or it may be recycled for use in the initial electrolysis step. The separated solid impure $LiOH.H_2O$ is desirably water-washed, and then dissolved in water and purified $LiOH.H_2O$ is recrystallized therefrom. Since, as pointed out above, $LiOH.H_2O$ has only slight solubility in aqueous solutions containing both LiCl and NaCl, and since such solubility is controllable by controlling the content of LiCl and NaCl in the aqueous solutions thereof, the amount of crude $LiOH.H_2O$ recoverable can be controlled within certain limits. Depending upon the LiCl and NaCl concentrations in the feed brine fed to the electrolysis cell, the extent to which the electrolysis is carried out, temperature and other controls, upwards of about 80% of the $LiOH.H_2O$ formed can be separated as about 98% $LiOH.H_2O$ and about 2% NaCl; and upwards of about 70% of the $LiOH.H_2O$ formed can be separated as about 99% $LiOH.H_2O$.

The electrolysis is carried out to an extent to convert from about 10% to about 60%, and, better still, from about 10% to about 25% of the lithium chloride present in the feed brine to $LiOH.H_2O$ in a single pass. If too high a percentage of the lithium chloride is converted per pass to $LiOH.H_2O$, the latter crystallizes or precipitates out and is lost in the diaphragm and also clogs the diaphragm.

was taking place. It may be noted that diaphragm cells are well known to the art and can be selected as desired for use in the practice of the present invention. For large scale, commercial use, the well known Hooker diaphragm cells are illustrative of suitable diaphragm cells. In the experimental work carried out pursuant to the present invention, using the experimental cell described above, the power source used in the electrolysis was a 10 ampere filtered rectifier circuit, the cell being operated at 10 amperes and 7 volts. It was found that 0.3 equivalent of electricity could be passed through 100 g. of electrolyte solution. This cell performance is very similar to that of commercial diaphragm cells. The results of an illustrative electrolysis are shown in Table I.

TABLE I

| Brine composition | Electrolyzed mixture composition | Gas composition |
|---|---|---|
| 25 g. LiCl | 12.6 g. $LiOH.H_2O$ | 10 g. $Cl_2$. |
| 2.6 g. NaCl | 12.4 g. LiCl | 0.3 g. $H_2$. |
| 72.4 g. $H_2O$ | 2.6 g. NaCl | |
| | 61.5 g. $H_2O$ | |

Illustrative solutions, prepared with compositions corresponding to electrolyzed solutions, were evaporated down and the solids filtered off, washed, dried, weighed and analyzed. The results of said experiments are shown below in Table II.

TABLE II

| Experiment No. | Wt. solid | Composition of solid | Wt. solution | Percent recovery of $LiOH.H_2O$ |
|---|---|---|---|---|
| 1 | 4.8 | 99.0% $LiOH.H_2O$, 1.0% NaCl. | 84.3 | 38 |
| 2 | 5.8 | 99.0% $LiOH.H_2O$, 1.0% NaCl. | 49.8 | 46 |
| 3 | 6.6 | 98.0% $LiOH.H_2O$, 2.0% NaCl. | 73.4 | 51 |
| 4 | 7.7 | 97.8% $LiOH.H_2O$, 2.2% NaCl. | 61.0 | 60 |
| 5 | 8.2 | 98.9% $LiOH.H_2O$, 1.1% NaCl. | 61.0 | 64 |
| 6 | 9.1 | 97.0% $LiOH.H_2O$, 3.0% NaCl. | 60.9 | 70 |
| 7 | 15.5 | 80.0% $LiOH.H_2O$, 19.0% NaCl. | 19.5 | 98 |

The solid in each experiment was washed with 10 ml. of distilled water, except for experiment No. 2 in which the solid was washed with 20 ml. distilled water and for experiment No. 7 in which the solid was not washed. In experiment No. 1, the electrolyzed mixture was not evaporated down, the solid being filtered out of the mixture just as it came from the electrolysis cell.

It was found that the $LiOH.H_2O$ obtained in the electrolyzed solution solids could be effectively purified by recrystallization. The results of typical recrystallization experiments are shown in Table III.

TABLE III

| Experiment No. | Composition of Solid [1] | Composition of solid [2] | Percent recovery $LiOH.H_2O$ |
|---|---|---|---|
| 1 | 97% $LiOH.H_2O$ (33.3 g.), 3% NaCl | 99.5% $LiOH.H_2O$ (26.9 g.), 0.5% NaCl | 83 |
| 2 | 83% $LiOH.H_2O$ (15.2 g.), 17% NaCl | 98% $LiOH.H_2O$ (11.5 g.), NaCl | 89 |

[1] Before recrystallization.
[2] After recrystallization.

In the experimental work described below, the diaphragm cell utilized was one made from a Buchner funnel fitted with a copper screen which served as the cathode. A layer of asbestos fibers, about ¼ inch thick, was deposited on top of the cathode screen to serve as a diaphragm. The anode was a cylinder of graphite placed very close to the top of the asbestos diaphragm. The LiCl-NaCl brine was poured in the filter and allowed to trickle through the diaphragm and across the cathode while electrolysis The data from experiment No. 2 indicate that more than 80% of the $LiOH.H_2O$ formed in the electrolysis can be obtained in a quite pure state simply by evaporating down the electrolyzed solution to obtain a very contaminated product of $LiOH.H_2O$ which can then be recrystallized to obtain the quite pure $LiOH.H_2O$.

The following flow sheet is illustrative of the results of certain experimental work carried out pursuant to the present invention.

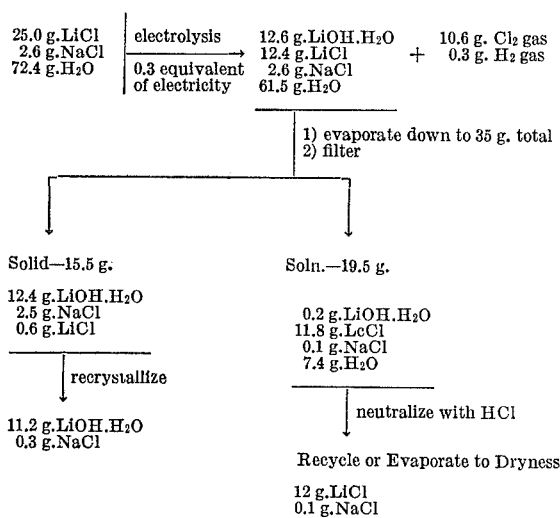

We claim:
1. A method of recovering lithium as $LiOH \cdot H_2O$ from an aqueous chloride feed brine containing substantial proportions of lithium chloride and sodium chloride and in which any magnesium, calculated as magnesium chloride, is present in an amount not exceeding about 0.01% by weight of said feed brine, which comprises electrolyzing said feed brine in a diaphragm cell whereby to maintain the catholyte separated from the anolyte, to produce an electrolyzed solution in which from about 10 to about 60% of the LiCl present in said feed brine is converted to $LiOH \cdot H_2O$ and in which the NaCl remains essentially unchanged, and separating the solid $LiOH \cdot H_2O$ from said electrolyzed solution.

2. The method of claim 1, wherein the feed brine contains from about 8% to 30% LiCl and from about 2 to 15% NaCl.

3. The method of claim 1, wherein the recovered electrolyzed solution is recycled for further electrolysis to produce additional quantities of $LiOH \cdot H_2O$.

4. The method of claim 2, wherein from about 10 to 25% of the lithium chloride present in the feed brine is converted in a single electrolysis step to $LiOH \cdot H_2O$.

5. The method of claim 2, wherein the total concentration of all salts other than the LiCl and NaCl in the feed brine does not exceed 3%.

References Cited

UNITED STATES PATENTS 2,715,608   8/1955   Casciani et al. _____ 204—98

TA-HSUNG TUNG, Primary Examiner

U.S. Cl. X.R.

204—128, 129